US012680846B2

(12) United States Patent
Shimokawa

(10) Patent No.: US 12,680,846 B2
(45) Date of Patent: Jul. 14, 2026

(54) INFORMATION PROCESSING SYSTEM, INFORMATION PROCESSING METHOD, PROGRAM, AND NON-VOLATILE STORAGE MEDIUM

(71) Applicant: ASAHI KASEI HOMES CORPORATION, Tokyo (JP)

(72) Inventor: Miyoko Shimokawa, Tokyo (JP)

(73) Assignee: ASAHI KASEI HOMES CORPORATION, Tokyo (JP)

( * ) Notice: Subject to any disclaimer, the term of this patent is extended or adjusted under 35 U.S.C. 154(b) by 0 days.

(21) Appl. No.: 18/662,057

(22) Filed: May 13, 2024

(65) Prior Publication Data

US 2024/0295421 A1     Sep. 5, 2024

Related U.S. Application Data

(63) Continuation of application No. PCT/JP2022/042355, filed on Nov. 15, 2022.

(30) Foreign Application Priority Data

Nov. 15, 2021     (JP) ................................. 2021-185475

(51) Int. Cl.
  *G01D 21/02*     (2006.01)
  *G06Q 10/087*     (2023.01)
  *G06V 20/52*     (2022.01)
(52) U.S. Cl.
  CPC ........... *G01D 21/02* (2013.01); *G06Q 10/087* (2013.01); *G06V 20/52* (2022.01)
(58) Field of Classification Search
  CPC .. H04Q 9/00; H04Q 2209/00; H04Q 2209/10; H04Q 2209/40; H04Q 2209/43;
  (Continued)

(56) References Cited

U.S. PATENT DOCUMENTS 9,986,313 B2 * 5/2018 Schwarzkopf ........... H04Q 9/00
11,761,798 B2 * 9/2023 Watanabe .............. G01D 21/02
340/870.02

(Continued)

FOREIGN PATENT DOCUMENTS

JP     2007-282701     11/2007
JP     2007-328464 A     12/2007
(Continued)

OTHER PUBLICATIONS

Written Opinion dated Feb. 7, 2023 issued in International Application No. PCT/JP2022/042355, along with corresponding English translation.

(Continued)

*Primary Examiner* — Franklin D Balseca
(74) *Attorney, Agent, or Firm* — Greenblum & Bernstein, P.L.C.

(57)     ABSTRACT

An information processing system includes a platform and a gateway device, and the gateway device includes: an acceptance unit that accepts sensor information; an acquisition unit that acquires, from a storage unit that stores accumulation destination information, information for specifying a first database related to first sensor identification information of first sensor information accepted by the acceptance unit, and that acquires, from the storage unit, information for specifying a second database related to second sensor identification information of second sensor information different from the accepted first sensor information; a creation unit that creates a first sensor information notification with the first database including the first sensor information as an accumulation destination, and a second sensor information notification with the second database including the second sensor information as an accumulation destination; and a communication unit that transmits the first sensor informa- (Continued)

tion notification and the second sensor information notification to the platform.

12 Claims, 4 Drawing Sheets

(58) Field of Classification Search
CPC .......... H04Q 2209/70; H04Q 2209/80; H04Q
2209/82; H04Q 2209/826; H04Q
2209/84; G01D 21/02; G06V 20/52;
G06Q 10/087; A61B 5/0002; A61B
5/0004; A61B 5/002; A61B 5/0022
See application file for complete search history.

(56) References Cited

U.S. PATENT DOCUMENTS

| | | | |
|---|---|---|---|
| 2006/0176169 A1* | 8/2006 | Doolin | G08B 31/00 |
| | | | 340/521 |
| 2015/0381737 A1 | 12/2015 | Quinn et al. | |
| 2017/0359416 A1 | 12/2017 | Matsuda | |
| 2018/0139067 A1 | 5/2018 | Josyula | |
| 2019/0268425 A1 | 8/2019 | Kurihara et al. | |
| 2020/0357503 A1 | 11/2020 | Sugaya et al. | |

FOREIGN PATENT DOCUMENTS

| | | | | | |
|---|---|---|---|---|---|
| JP | 2012-164369 A | 8/2012 | | | |
| JP | 2014-071654 | 4/2014 | | | |
| JP | 2015-146168 A | 8/2015 | | | |
| JP | 2017-220148 A | 12/2017 | | | |
| JP | 2018-77819 A | 5/2018 | | | |
| JP | 2019-148963 A | 9/2019 | | | |
| JP | 2020-527065 A | 9/2020 | | | |
| JP | 2020-198494 A | 12/2020 | | | |
| JP | 2020201851 A | * | 12/2020 | ............ | G16H 20/00 |
| JP | 2021-140704 | 9/2021 | | | |
| JP | 2021-176053 | 11/2021 | | | |
| WO | 2019/006536 A1 | 1/2019 | | | |
| WO | 2019/116679 A1 | 6/2019 | | | |
| WO | 2020/121492 A1 | 6/2020 | | | |

OTHER PUBLICATIONS

International Search Report Issued in International Patent Application No. PCT/JP2022/042355, dated Feb. 7, 2023, along with an English translation thereof.

* cited by examiner

FIG. 1

INFORMATION PROCESSING SYSTEM, INFORMATION PROCESSING METHOD, PROGRAM, AND NON-VOLATILE STORAGE MEDIUM

TECHNICAL FIELD

The present invention relates to an information processing system, an information processing method, a program, and a non-volatile storage medium.

BACKGROUND ART

A technique of using a sensor platform of clothing of a wearer to interact with a remote network device using a plurality of pieces of sensed biometric data is known (see, for example, Patent Document 1). This technique receives data sets from sensors mounted on clothing and compares the data sets with a data model consisting of a physical state and a mental state to determine whether or not to transmit a command.

CITATION LIST

Patent Document

[Patent Document 1]
    Published Japanese Translation No. 2020-527065 of the PCT International Publication

SUMMARY OF INVENTION

Technical Problem

In the above-described technique, it is not possible to integrate and use various types of sensor information measured inside a building and accumulated for different purposes.

An object of the present invention is to provide an information processing system, an information processing method, a program, and a non-volatile storage medium capable of integrating and using various types of sensor information.

Solution to Problem (1) In order to solve the above problems, according to one aspect of the present invention, there is provided an information processing system including a platform and a gateway device, in which the gateway device includes: an acceptance unit that accepts sensor information output from each of a plurality of sensors; an acquisition unit that acquires, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information accepted by the acceptance unit, and that acquires, from the storage unit, information for specifying a second database related to second sensor identification information of second sensor information different from the first sensor information accepted by the acceptance unit; a creation unit that creates a first sensor information notification with the first database including the first sensor information as an accumulation destination, and a second sensor information notification with the second database including the second sensor information as an accumulation destination; and a communication unit that transmits the first sensor information notification and the second sensor information notification to the platform.

With the information processing system according to the present aspect, the information processing system includes a platform and a gateway device. The gateway device accepts sensor information output from each of the plurality of sensors. Each of the plurality of sensors periodically outputs sensor information. The gateway device acquires, from a storage unit that stores accumulation destination information in which sensor identification information and information for specifying a database that accumulates the sensor information are associated with each other for each of the plurality of sensors, information for specifying a first database related to first sensor identification information of first sensor information and information for specifying a second database related to second sensor identification information of second sensor information, which are accepted. The storage unit may be provided in the gateway device or may be provided in the cloud. The information processing system creates a first sensor information notification with the first database including the first sensor information as an accumulation destination and a second sensor information notification with the second database including the second sensor information as an accumulation destination, which are accepted. The gateway device transmits the first sensor information notification and the second sensor information notification to the platform.

In this way, in the information processing system, the gateway device can accept sensor information output from each of a plurality of sensors, acquire information for specifying a first database related to first sensor identification information of first sensor information that is accepted, acquire information for specifying a second database related to second sensor identification information of second sensor information that is accepted, and create a first sensor information notification with the first database including the first sensor information as an accumulation destination and a second sensor information notification with the second database including the second sensor information as an accumulation destination. For this reason, the gateway device can transmit the first sensor information notification and the second sensor information notification to the platform.

(2) According to one aspect of the present invention, there is provided an information processing method executed by a computer, the information processing method including: accepting sensor information output from each of a plurality of sensors; acquiring, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information among the accepted sensor information, and acquiring, from the storage unit, information for specifying a second database related to second sensor identification information of second sensor information among the accepted sensor information; creating a first sensor information notification with the first database including the first sensor information as an accumulation destination, and a second sensor information notification with the second database including the second sensor information as an accumulation destination; and transmitting the first sensor information notification and the second sensor information notification to the platform.

With the information processing method according to one aspect of the present invention, although the category is different from that of the information processing system, they are substantially the same invention, and have similar functions and effects.

(3) According to one aspect of the present invention, there is provided a program causing a computer to execute: accepting sensor information output from each of a plurality of sensors; acquiring, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information among the accepted sensor information, and acquiring, from the storage unit, information for specifying a second database related to second sensor identification information of second sensor information among the accepted sensor information; creating a first sensor information notification with the first database including the first sensor information as an accumulation destination, and a second sensor information notification with the second database including the second sensor information as an accumulation destination; and transmitting the first sensor information notification and the second sensor information notification to the platform.

With the information processing program according to one aspect of the present invention, although the category is different from that of the information processing system, they are substantially the same invention, and have similar functions and effects.

(4) According to one aspect of the present invention, there is provided a non-volatile storage medium in which a computer-readable program is stored, the program causing a computer to execute: accepting sensor information output from each of a plurality of sensors; acquiring, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information among the accepted sensor information, and acquiring, from the storage unit, information for specifying a second database related to second sensor identification information of second sensor information among the accepted sensor information; creating a first sensor information notification with the first database including the first sensor information as an accumulation destination, and a second sensor information notification with the second database including the second sensor information as an accumulation destination; and transmitting the first sensor information notification and the second sensor information notification to the platform.

With the non-volatile storage medium according to one aspect of the present invention, although the category is different from that of the information processing system, they are substantially the same invention, and have similar functions and effects.

Advantageous Effects of Invention

According to the present invention, the information processing system can integrate and use various types of sensor information.

BRIEF DESCRIPTION OF DRAWINGS

FIG. 1 is a diagram showing a configuration example of an information processing system according to an embodiment of the present invention.

DESCRIPTION OF EMBODIMENTS

Figure 2:
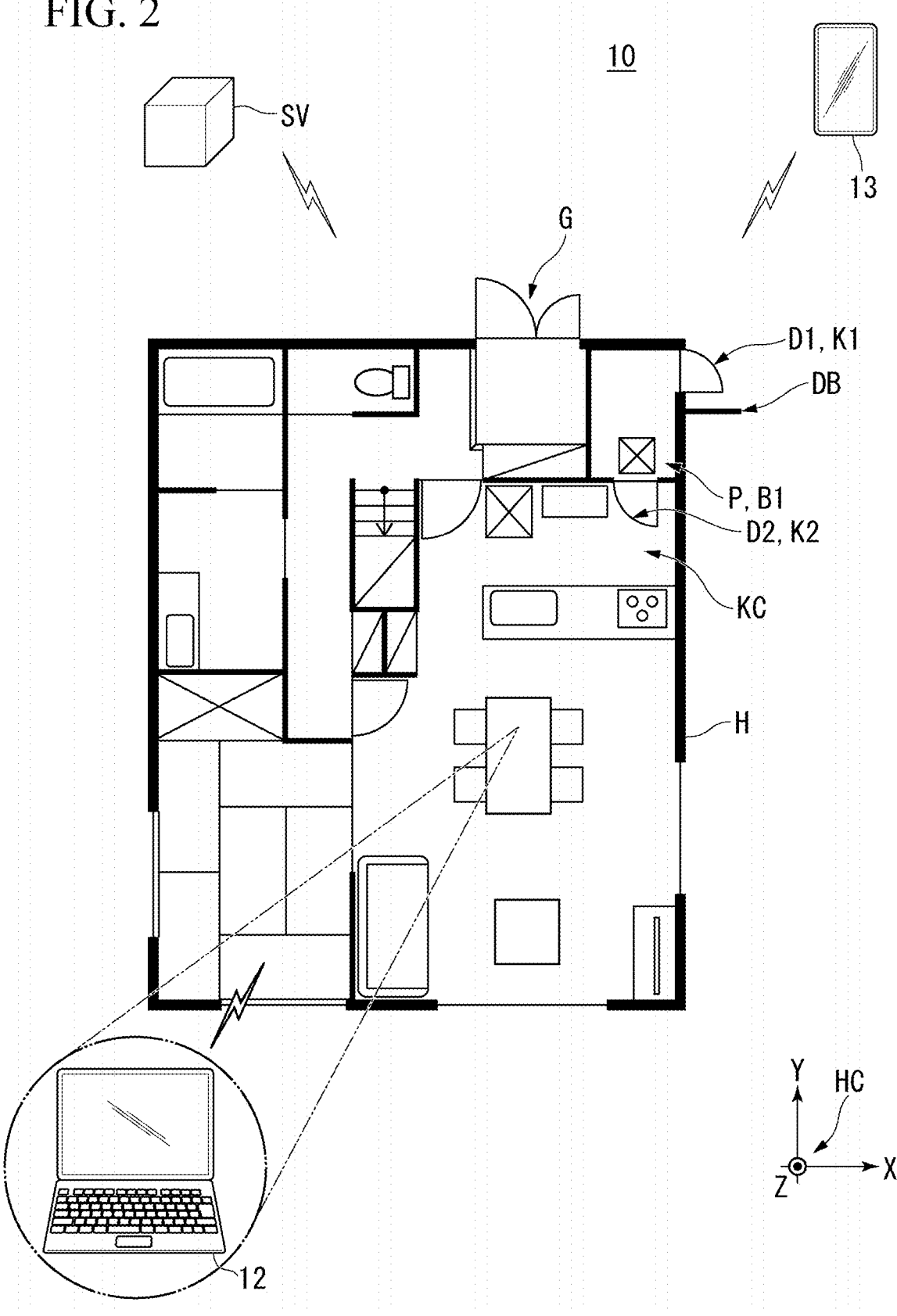
FIG. 2 is a diagram showing an example of a configuration of a pantry system.

An information processing system, an information processing method, and a program according to the present embodiment will be described below with reference to the drawings. The embodiments to be described below are merely examples, and the embodiments to which the present invention is applied are not limited to the following embodiments.

In addition, in all the drawings for describing the embodiments, parts having the same functions are denoted by the same reference numerals, and repeated descriptions will be omitted.

Moreover, the expression "on the basis of XX" referred to in the present application means "based on at least XX" and also includes cases where it is based on another element in addition to XX. Furthermore, the expression "on the basis of XX" is not limited to a case where XX is directly used, and also includes a case where calculation or processing is performed on XX. The term "XX" is an optional element (for example, optional information).

Embodiment (Information Processing System)

Figure 1:
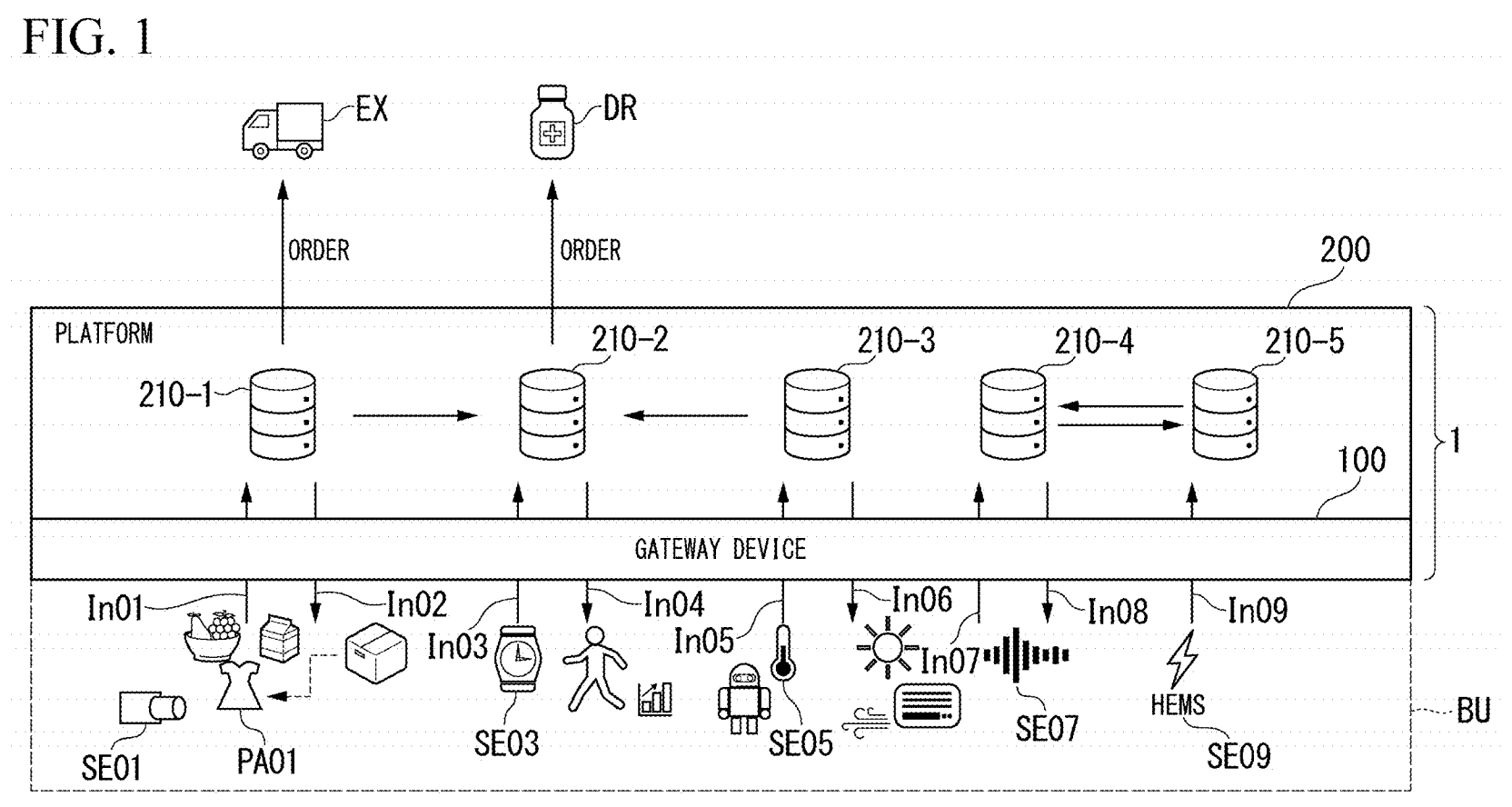

FIG. 1 is a diagram showing a configuration example of an information processing system according to an embodiment of the present invention. In FIG. 1, an information processing system 1 includes a gateway device 100 and a platform 200.

FIG. 1 shows an image sensor SE01, a vital sensor SE03, a temperature and humidity sensor (temperature sensor, humidity sensor) SE05, an acceleration sensor SE07, and a power measurement unit SE09 that are installed in a building BU, in addition to the gateway device 100 and the platform 200. Furthermore, an illuminance sensor, a solar radiation amount sensor, an atmospheric pressure sensor, and a sound pressure sensor may be installed in the building BU. As an example, the following description continues with a case where the image sensor SE01, the vital sensor SE03, the temperature and humidity sensor (temperature sensor, humidity sensor) SE05, the acceleration sensor SE07, and the power measurement unit SE09 are installed in the building BU. An example of a building BU is a house. The following description continues with a case where the building BU is a house.

The image sensor SE01 is provided in a pantry system PA01 as an example. An example of the pantry system PA01 is a pantry system including a pantry provided in a house and a control unit. The pantry includes a first storage box and a control unit. The first storage box may be provided in the pantry or may be the pantry itself. Further, the first storage box includes a first door. The first door is a door that connects the inside of the first storage box to the outside of the house.

Further, the first door includes a first electronic lock that performs locking of the first door or unlocking of the first door. The control unit is provided in at least one of the inside of the pantry and the outside of the pantry. The control unit also causes the first electronic lock to lock the first door or to unlock the first door on the basis of the accepted operation. Accordingly, the pantry system PA01 can suppress the intrusion of a person from the outside of the house into the inside of the house via the first storage box with respect to the use of, for example, the delivery item of food and daily necessities that are frequently generated on a daily basis while improving the convenience of residents of the house.

Hereinafter, such a pantry system PA01, a pantry P, and a house provided with the pantry P will be described in detail, but the pantry P may be replaced with a shoe closet.

The image sensor SE01 may be configured to acquire information indicating the delivery status of the delivery item (hereinafter also referred to as delivery information). Here, the delivery information includes information indicating that the delivery item has been delivered to the house, information indicating the content of the delivery item, information regarding the expiration date of the delivery item, and the like. The delivery information can be acquired from a delivery slip, a two-dimensional code, a wireless tag, or the like attached to the delivery item or from an information processing device of a delivery service provider. The delivery information may be information provided to any device in a building or any terminal device used by a resident of a house.

<Configuration of Pantry System>

FIG. 2 is a diagram showing an example of a configuration of a pantry system. A pantry system 10 is an example of the aforementioned pantry system PA01. The pantry system 10 includes a pantry P, a control device (not shown), an information processing device 12, and a mobile terminal 13.

The pantry system 10 is a system that improves the convenience of a person who uses the pantry. For example, the pantry system 10 can reduce the effort of a person who stores or accommodates items in the pantry P. Further for example, the pantry system 10 can reduce the effort of a person who takes out items stored or accommodated in the pantry P. The reason for this will be described below. In addition, for example, the pantry system PA01 can place an order for the supply of items to the pantry from a vendor in accordance with the storage status or the accommodation status of the items in the pantry without accepting any operation from a person who uses the pantry.

The image sensor SE01 detects purchase information, such as order information for the items to be supplied to the pantry P. The image sensor SE01 can capture many things such as entering and exiting people, face recognition, a movement status of an article, a behavior of a person, a walking speed, and a pattern of an operation. For example, the image sensor SE01 acquires purchasing information on the basis of information brought into the pantry P from the outside. The image sensor SE01 outputs information In01 including purchasing information and identification information of the image sensor SE01 to the gateway device 100. As a method for acquiring purchasing information, purchasing information may be acquired by collecting information from a smartphone. An example of information collected from smartphones is information that can be acquired by information linkage with an electronic commerce (EC) store or a delivery company, and information that can be acquired by information linkage with reading of a receipt of a user, a credit card, or a point card.

Note that the image sensor SE01 may have a function of converting information described in a receipt of a user into image data. In this case, the image sensor SE01 outputs a result of converting the information described in the receipt of the user into image data as purchasing information.

Further, the pantry system PA01 is a system that improves the safety of a house provided with a pantry. For example, the pantry system PA01 can suppress intrusion from the outside of the house into the inside of the house via the pantry.

Hereinafter, a case where the pantry system 10 is applied to a house H will be described as an example. In other words, in the pantry system 10 in this example, the pantry P is provided in the house H.

Here, the house H in which a certain resident resides means an inside of a locked area of the resident in a building in which the resident resides. The locked area of the resident is an area in which it is possible to prohibit a person other than the resident from entering by the resident locking the locked area in the building. The number of rooms included in the locked area of the resident may be one or two or more. For example, in a case where the building is a detached house, the house includes the detached house. However, in this case, the house does not include the area attached to the detached house. More specifically, in this case, the house does not include, for example, a garden attached to the detached house, an area between the detached house and a fence attached to the detached house, and the like. In addition, for example, in a case where the building is a certain condominium, the house includes a dwelling unit in which the resident resides in the condominium. However, in this case, the house does not include an area outside the dwelling unit in the area of the condominium. More specifically, in this case, the house does not include, for example, any dwelling unit other than the dwelling unit in the condominium, common parts such as an entrance in the condominium, and the like. In addition, in a case where the resident resides in a building provided with a windbreak room, the house may have a configuration that includes a windbreak room, or may have a configuration that does not include a windbreak room.

In the example shown in FIG. 2, the house H is a detached house. An outer wall is provided in an outer periphery of the house H. Further, as shown in FIG. 2, the first floor portion of the house H has a substantially rectangular shape in a plan view. A plurality of rooms are provided in the first floor portion of the house H. More specifically, in the first floor portion of the house H, the interior of the house H is divided into a plurality of rooms by a plurality of walls. At least a part of a wall located between adjacent rooms of the plurality of rooms is provided with an opening or a door through which the resident moves between the rooms.

In the following, for convenience of description, a person living in the house H will be simply referred to as a resident. Further, in the following, for convenience of description, an area inside the house H (that is, an area surrounded by the outer wall of the house H) will be referred to as the inside of the house H. Further, in the following, for convenience of description, an area outside the house H will be referred to as the outside of the house H. Note that the pantry system 10 may be configured to be applied to a building other than a house, such as a commercial building or a factory, instead of a house such as the house H.

As shown in FIG. 2, the plurality of rooms provided in the first floor portion of the house H include an entrance, a kitchen, a dining room, a living room, a washroom, a bathroom, a toilet, and the like, together with the aforementioned pantry P. In other words, the pantry P is one of the rooms provided in the first floor portion of the house H. Note that the pantry P may be one of the rooms provided in the second floor or higher portion of the house H. The pantry system 10 will be described below with reference to the first floor portion of the house H provided with the pantry P as an example. For this reason, in the following, for convenience of description, the first floor portion of the house H will be simply referred to as the house H.

Here, a three-dimensional coordinate system HC shown in FIG. 2 is a coordinate system indicating directions related to the house H. The positive direction of a Z-axis in the three-dimensional coordinate system HC indicates a direction from the floor surface of the house H to the ceiling surface of the house H among directions orthogonal to the floor surface of the house H. Further, the positive direction of a Y-axis in the three-dimensional coordinate system HC indicates a direction from the inside of the house H to the outside of the house H among directions orthogonal to the entrance wall. The entrance wall refers to an outer wall of the house H in which an entrance door G is provided. The entrance door G refers to a door of an entrance of the house H. In addition, the positive direction of an X-axis in the three-dimensional coordinate system HC indicates a direction from the right side to the left side of the entrance door G in a case where the entrance wall is viewed from the outside of the house H, among directions orthogonal to each of the Y-axis and the Z-axis.

The pantry P is an example of the aforementioned pantry. The pantry P is a room for storing items desired by the resident among rooms provided in the house H. Examples of the items include food and drink, daily necessities, cooking utensils, and tableware. In addition, the pantry P is a room for storing and accommodating delivery items delivered by a delivery person. Hereinafter, as an example, a case where the delivery item is food and drink will be described. Note that, instead of the food and drink, the delivery items may be other items that can be stored and accommodated in the pantry P, such as daily necessities, cooking utensils, tableware, miscellaneous goods, and clothing.

Further, the pantry P is provided in the house H to be adjacent to a room desired by the resident among the rooms provided in the house H. Further, the pantry P is provided in the house H to be adjacent to an outer wall desired by the resident among the outer walls of the house H. The desired room includes at least one of a kitchen, a dining room, and a living room. This also includes rooms that coexist in one, such as a living-dining room (LD), a living-dining-kitchen (LDK), and a dining-kitchen (DK). In other words, each of the living room and the dining room includes a living-dining room. Further, each of the living room, dining room, and kitchen also includes a living-dining-kitchen. Each of the kitchen and dining room also includes a dining-kitchen. In the example shown in FIG. 2, the desired room includes a kitchen KC. In other words, in the example, the pantry P is adjacent to the kitchen KC. In addition, instead of a part or all of the kitchen, the dining room, and the living room, the desired room may include another room desired by the resident in view of convenience, among a plurality of rooms provided in the house H. Further, in the example shown in FIG. 2, the desired outer wall is the outer wall of the house H on the positive direction side of the X-axis in the three-dimensional coordinate system HC.

Furthermore, the pantry P includes a first storage box B1. The first storage box B1 is provided in the pantry P. The first storage box B1 is a box that is provided inside the pantry P and is used to store and accommodate delivery items delivered by a delivery person. The first storage box B1 is provided in the pantry P to be adjacent to an outer wall to which the pantry P is adjacent among the outer walls of the house H.

The first storage box B1 is a box having a rectangular parallelepiped shape, for example. Note that the shape of the first storage box B1 may be other shapes instead of the rectangular parallelepiped shape. Further, the first storage box B1 may be a walk-in type box. In other words, the volume of the first storage box B1 may be a volume equal to or larger than the volume that can accommodate a person. In a case where the first storage box B1 is a walk-in type box, in the pantry system 10, a person (for example, a resident, a delivery person who delivers the delivery item, or the like) who puts in and takes out delivery items can easily put in and take out delivery items stored in the first storage box B1. That is, the pantry system 10 can improve the convenience of a person who puts in and takes out the delivery items. Note that the first storage box B1 may be a box that is not a walk-in type. That is, the volume of the first storage box B1 may be a volume that cannot accommodate a person.

Further, the first storage box B1 includes a first door D1 and a second door D2.

The first door D1 is an example of the aforementioned first door. The first door D1 is a door that connects the inside of the first storage box B1 to the outside of the house H. For example, an opening that connects the outside of the house H to the inside of the first storage box B1 is formed in a portion of the outer wall of the house H adjacent to the first storage box B1. Also, the first door D1 is provided on the side surface to close the opening. In addition, in the pantry P, the side surface of the first storage box B1 may be configured to be formed by the portion. In this case, an opening that connects the outside of the house H to the inside of the first storage box B1 is formed on the side surface.

In a case where the first door D1 is opened, the inside of the first storage box B1 is connected to the outside of the house H. On the other hand, in a case where the first door D1 is closed, the inside of the first storage box B1 is disconnected from the outside of the house H. Accordingly, for example, a delivery person who delivers a delivery item to the house H can store the delivery item inside the first storage box B1 by opening the first door D1 from the outside of the house H.

Further, the first door D1 includes a first electronic lock K1. The first electronic lock K1 is an example of the aforementioned first electronic lock. The first electronic lock K1 is provided in the first door D1. The first electronic lock K1 is controlled by a control device to lock the first door D1 or to unlock the first door D1.

The second door D2 is an example of the aforementioned second door. The second door D2 is a door that connects the inside of the first storage box B1 to a desired room in the house H. For example, an opening that connects the desired room to the inside of the first storage box B1 is formed in a surface of the first storage box B1 that is adjacent to the desired room. Also, the second door D2 is provided on the surface to close the opening. In the example shown in FIG. 2, the surface is a side surface of the first storage box B1 on the negative direction side of the Y-axis in the three-dimensional coordinate system HC.

In a case where the second door D2 is opened, the inside of the first storage box B1 is connected to a desired room. On the other hand, in a case where the second door D2 is closed, the inside of the first storage box B1 is disconnected from a desired room. Accordingly, for example, by opening the second door D2 from inside the house H, the resident can take out the delivery item stored inside the first storage box B1 in the house H at the most suitable point of time for use without going outside of the house H from inside the house H and without being bothered by the movement of the delivery item. As a result, the pantry system 10 can improve the convenience of residents.

Further, the second door D2 includes a second electronic lock K2. The second electronic lock K2 is an example of the aforementioned second electronic lock. The second electronic lock K2 is provided in the second door D2. The second electronic lock K2 is controlled by the control device to lock the second door D2 or to unlock the first door D1.

With such a first storage box B1, the pantry P can store and accommodate delivery items delivered by a delivery person. Then, the resident can take out the delivery item stored and accommodated in this way from the first storage box B1 in the house H at the most suitable point of time for use without being bothered by the movement of the delivery item.

Here, a member such as a shelf board on which the delivery item can be placed may be provided inside the first storage box B1, or the member may not be provided. In addition, the area may be divided into a plurality of areas by a plate or the like, or may not be divided into a plurality of areas. In addition, a configuration may be employed in which one or more boxes having a size smaller than that of the first storage box B1 are provided in the area inside the first storage box B1, or a configuration may be employed in which no such box is provided. Hereinafter, as an example, a case where the area inside the first storage box B1 is not divided into a plurality of areas will be described.

The entire first storage box B1 may be one refrigerator compartment, one freezing compartment, one warming compartment, or the like.

The control device controls the entire pantry P. The control device is an information processing device including a processor, such as a central processing unit (CPU) (not shown). Further, the control device includes a storage unit (not shown in FIG. 2) and a communication unit (not shown in FIG. 2).

A processor provided in the control device executes various types of programs stored in the storage unit.

The storage unit includes, for example, a hard disk drive (HDD), a solid state drive (SSD), an electrically erasable programmable read-only memory (EEPROM), a read-only memory (ROM), a random access memory (RAM), etc. Note that the storage unit may be an external storage device connected to the control device by a digital input/output port or the like such as a universal serial bus (USB), instead of the being built in the control device. The storage unit stores various types of information, various types of images, various types of programs, etc. processed by the control device.

The communication unit includes a digital input/output port such as a USB, an Ethernet (registered trademark) port, and the like, for example.

Note that the processor provided in the control device may be another processor, such as a field programmable gate array (FPGA), instead of the CPU.

The control device causes the first electronic lock K1 to lock the first door D1 or unlock the first door D1 in response to an operation accepted from the resident via the information processing device 12. Further, the control device accepts the operation from the resident via the information processing device 12 through wireless or wired communication. For example, the control device accepts the operation from the resident via the information processing device 12 through wireless or wired communication.

Moreover, in a case where the first door D1 is unlocked by the first electronic lock K1, the control device causes the second electronic lock K2 to lock the second door D2. Accordingly, the control device can suppress the intrusion from the outside of the house H to the inside of the house H via the first storage box B1. For example, in a case where the pantry P is adjacent to the kitchen KC as shown in FIG. 2 and the second door D2 is open, the first door D1 cannot be unlocked in a case where a delivery person comes and tries to unlock the first door D1. This is to ensure the safety of residents. In addition, the pantry P may be configured to be provided with a display unit that displays information indicating to the delivery person that the second door D2 is open in this case, or may be configured to notify a mobile terminal owned by the delivery person of the information.

In addition, in a case where an authentication key issued in advance to the mobile terminal from the control device or the information processing device is accepted from the mobile terminal 13, the control device performs authentication using the accepted authentication key. In a case where the authentication is successful, the control device causes the first electronic lock K1 to unlock the first door D1. That is, the mobile terminal 13 can unlock the first door D1 through the authentication. Thereby, the control device can suppress a case where the first door D1 is opened by an unintended person.

Further, the control device orders delivery of the delivery item desired by the resident in response to the operation accepted from the resident via the information processing device 12. In this case, the control device may be configured to place the order with a seller who sells the delivery item, may be configured to place the order with a management company that manages the house H, or may be configured to place the order with another vendor.

Here, in the example shown in FIG. 2, the control device is built in the pantry P. In other words, in the example, the pantry P includes a control device. That is, in this example, the pantry system 10 includes the pantry P provided with a control device, the information processing device 12, and the mobile terminal 13. Note that the control device may be configured to be installed outside the pantry P instead of being built in the pantry P. The outside of the pantry P may be the outside of the pantry P within the house H or may be outside the house H. In such a case, the control device is communicatively connected to each of the pantry P, the information processing device 12, and the mobile terminal 13 in a wireless or wired manner. Further, for example, in this case, the control device 11 may be configured to be connected to each of the pantry P, the information processing device 12, and the mobile terminal 13 via a communication network, such as the Internet. Further, the functions of the control device may be configured to be separately provided in both of the inside of the pantry P and the outside of the pantry P.

As described above, the information processing device 12 is an information processing device owned by a resident. The information processing device 12 is, for example, a notebook personal computer (PC), a desktop PC, a tablet PC, a multifunctional mobile phone terminal (smartphone), a mobile phone terminal, or a personal digital assistant (PDA), but is not limited thereto. In the example shown in FIG. 2, the information processing device 12 is a notebook PC.

For example, a dedicated application program PM that performs processing related to the pantry P is installed in the information processing device 12. In this case, the resident can operate the control device via an operation screen among various screens displayed on the display of the information processing device 12 by executing the application program PM. Here, the operation screen is a screen that accepts an operation of causing the control device to perform various types of processing.

For example, the resident can cause the control device to display a first captured image on the display of the information processing device 12 via the operation screen. Further, for example, the resident can cause the control device to place an order for delivery of the delivery item desired by the resident via the operation screen.

The mobile terminal 13 is, for example, a handheld computer of a delivery person who delivers delivery items. Note that the mobile terminal 13 may be a tablet PC, a multifunctional mobile phone terminal, a mobile phone terminal, a PDA, or the like of the delivery person instead of the handheld computer. The mobile terminal 13 accepts an authentication key issued in advance by the control device or the information processing device 12. The mobile terminal 13 outputs the accepted authentication key to the control device using some method. Thereby, the delivery person can cause the control device to unlock the first door D1. As a result, the delivery person can open the first door D1 and store the delivery item in the first storage box B1. Note that the method will be described later.

In addition, in a case where the pantry P is adjacent to the kitchen (in FIG. 2, the kitchen KC) as in the example shown in FIG. 2, the delivered groceries or daily necessities can be used in the kitchen directly and immediately without being moved in advance near the kitchen or inside the kitchen from the storage box (the first storage box B1 or the second storage box B2) provided in the pantry P. In a case where there are groceries or daily necessities that are delivered on a daily basis, the pantry P especially further improves the convenience of the user. Moreover, in a case where the pantry P is adjacent to the kitchen (in FIG. 2, the kitchen KC) as in the example shown in FIG. 2, the distance for moving the groceries or daily necessities from the storage box to a refrigerator installed in the kitchen is short. For this reason, the pantry P can save the effort of carrying the frozen or refrigerated groceries and the like delivered to the pantry P.

In addition, even in a case where the pantry P is used as a secondary refrigerator to store the groceries delivered to the storage box until the groceries are used, without moving them to the refrigerator, the user can immediately take out the groceries from the pantry P when he or she wants to use them because the kitchen and the pantry P are adjacent to each other. Such an effect is an effect that is similarly obtained by the pantry P even in a case where the pantry P is adjacent to the dining room, the living room, etc.

Moreover, the pantry P may be disposed by being replaced with a space for other purposes, such as a shoe cloakroom or an entrance storage. The description will continue by referring back to FIG. 1.

The vital sensor SE03 detects vital signs such as a blood pressure, a pulse, a pulse wave, a respiration rate, a body temperature, a blood glucose level, urine, components of metabolites such as sebum and sweat, and a hydrogen ion index. The vital sensor SE03 transmits vital information In03 including a detection result of the vital sign and identification information of the vital sensor SE03 to the gateway device 100.

The temperature and humidity sensor SE05 detects the temperature, the humidity, and the so on of the space. The temperature and humidity sensor SE05 transmits temperature and humidity information including a detection result of the temperature and humidity and identification information of the temperature and humidity sensor SE05 to the gateway device 100.

The acceleration sensor SE07 detects an acceleration occurring in the building. The acceleration sensor SE07 transmits acceleration information In07 including a detection result of the acceleration and identification information of the acceleration sensor SE07 to the gateway device 100.

The power measurement unit SE09 is installed, for example, in a distribution board or a power meter, measures and calculates a current, a voltage, and a power factor in the distribution board or the power meter, and converts the measured and calculated value into power or power amount. The power measurement unit SE09 transmits power information In09 including a result of conversion into power or power amount (hereinafter referred to as "power information") and identification information of the power measurement unit SE09 to the gateway device 100. The power measurement unit SE09 may be connected to a home energy management service (HEMS) or may not be connected thereto.

The gateway device 100 receives the information In01 transmitted by the image sensor SE01 and accepts the received information In01. The gateway device 100 acquires purchasing information included in the accepted information In01 and the identification information of the image sensor SE01. The gateway device 100 acquires an accumulation destination associated with the acquired identification information of the image sensor SE01 from a storage unit that stores accumulation destination information in which sensor identification information and information for specifying a database that accumulates sensor information corresponding to the sensor identification information are associated for each of the plurality of sensors. Here, the gateway device 100 acquires information for specifying a purchasing information database (DB) 210-1 as the accumulation destination.

The gateway device 100 creates an image sensor information notification that includes purchasing information and has the purchasing information DB 210-1 as a destination (accumulation destination). The gateway device 100 transmits the created image sensor information notification to the platform 200.

The gateway device 100 receives the vital information In03 transmitted by the vital sensor SE03, and accepts the received vital information In03. The gateway device 100 acquires vital information included in the accepted vital information In03 and identification information of the vital sensor SE03. The gateway device 100 acquires an accumulation destination associated with the acquired identification information of the vital sensor SE03 from the storage unit that stores the accumulation destination information. Here, the gateway device 100 acquires information for specifying a healthcare information DB 210-2 as the accumulation destination.

The gateway device 100 creates a vital sensor information notification that includes vital information and has the healthcare information DB 210-2 as a destination (accumulation destination). The gateway device 100 transmits the created vital sensor information notification to the platform 200.

The gateway device 100 receives temperature and humidity information In05 transmitted by the temperature and humidity sensor SE05, and accepts the received temperature and humidity information In05. The gateway device 100 acquires temperature and humidity information included in the accepted temperature and humidity information In05 and identification information of the temperature and humidity sensor SE05. The gateway device 100 acquires an accumulation destination associated with the acquired identification information of the temperature and humidity sensor SE05 from the storage unit that stores the accumulation destination information. Here, the gateway device 100 acquires information for specifying a living environment information DB 210-3 as the accumulation destination.

The gateway device 100 creates a temperature and humidity sensor information notification that includes temperature and humidity information and has the living environment information DB 210-3 as a destination (accumulation destination). The gateway device 100 transmits the created temperature and humidity sensor information notification to the platform 200.

The gateway device 100 receives the acceleration information In07 transmitted by the acceleration sensor SE07, and accepts the received acceleration information In07. The gateway device 100 acquires acceleration information included in the accepted acceleration information In07 and identification information of the acceleration sensor SE07. The gateway device 100 acquires an accumulation destination associated with the acquired identification information of the acceleration sensor SE07 from the storage unit that stores the accumulation destination information. Here, the gateway device 100 acquires information for specifying a building information DB 210-4 as the accumulation destination.

The gateway device 100 creates an acceleration sensor information notification that includes acceleration information and has the building information DB 210-4 as a destination (accumulation destination). The gateway device 100 transmits the created acceleration sensor information notification to the platform 200.

The gateway device 100 receives the power information In09 transmitted by the power measurement unit SE09 and accepts the received power information In09. The gateway device 100 acquires power information included in the accepted power information In09 and identification information of the power measurement unit SE09. The gateway device 100 acquires an accumulation destination associated with the acquired identification information of the power measurement unit SE09 from the storage unit that stores the accumulation destination information. Here, the gateway device 100 acquires information for specifying an energy information DB 210-5 as the accumulation destination.

The gateway device 100 creates a power sensor information notification that includes power information and has the energy information DB 210-5 as a destination (accumulation destination). The gateway device 100 transmits the created power sensor information notification to the platform 200.

The platform 200 receives the image sensor information notification, the vital sensor information notification, the temperature and humidity sensor information notification, the acceleration sensor information notification, and the power sensor information notification which are transmitted by the gateway device 100.

The platform 200 accumulates (stores) the purchasing information included in the received image sensor information notification in the purchasing information DB 210-1 which is the destination (accumulation destination).

The platform 200 accumulates (stores) the vital information included in the received vital sensor information notification in the healthcare information DB 210-2 which is the destination (accumulation destination).

The platform 200 accumulates (stores) temperature and humidity information included in a received temperature and humidity information notification in the living environment information DB 210-3 which is the destination (accumulation destination).

The platform 200 accumulates (stores) acceleration information included in a received acceleration information notification in the building information DB 210-4 which is the destination (accumulation destination).

The platform 200 accumulates (stores) power information included in a received power information notification in the energy information DB 210-5 which is the destination (accumulation destination).

The platform 200 orders items to an outside EX on the basis of the purchasing information stored in the purchasing information DB 210-1. The platform 200 creates purchasing information In02 of the item and transmits the created purchasing information In02 of the item to the gateway device 100.

The gateway device 100 receives the purchasing information In02 of the item transmitted by the platform 200. The gateway device 100 transmits the received purchasing information In02 of the item to, for example, a terminal device (not shown) in a pantry in the building.

The platform 200 determines a health condition on the basis of the vital information stored in the healthcare information DB 210-2. The platform 200 creates a result In04 of determining the health condition and transmits the created result In04 of determining the health condition to the gateway device 100.

The gateway device 100 receives the result In04 of determining the health condition transmitted by the platform 200. The gateway device 100 transmits the received result In04 of determining the health condition to, for example, any terminal device (not shown) in the building.

The platform 200 determines the temperature and humidity of the building on the basis of the temperature and humidity information stored in the living environment information DB 210-3. The platform 200 creates a result In06 of determining the temperature and humidity of the building. The platform 200 transmits the result In06 of determining the temperature and humidity of the building to the gateway device 100.

The gateway device 100 receives the result In06 of determining the temperature and humidity of the building transmitted by the platform 200. The gateway device 100 transmits the received result In06 of determining the temperature and humidity of the building to, for example, any terminal device (not shown) in the building.

As an example of the purpose of the result In06 of determining the temperature and humidity information of the building and the temperature and humidity of the building, there is a purpose of sending an instruction to one or more any terminal devices for controlling the comfortable temperature and humidity of the building or notifying a terminal of a resident using the temperature and humidity information of the building or the result of determining the temperature and humidity of the building.

For example, wasteful power consumption can be reduced by managing the temperature and humidity data for each room of a house for each time period and controlling an air conditioner (that is, used for a first purpose).

Further, by controlling the air conditioner so that the temperature and humidity are suitable for the resident, it is possible to achieve health promotion of the resident (that is, to be used for a first purpose different from the above-described first purpose).

The platform 200 determines the acceleration occurring in the building on the basis of the acceleration information stored in the building information DB 210-4, and creates sway information In08 of the building on the basis of a result of determining the acceleration occurring in the building. The platform 200 transmits the created sway information In08 of the building to the gateway device 100.

The gateway device 100 receives the sway information In08 of the building transmitted by the platform 200. The gateway device 100 transmits the received sway information In08 of the building to, for example, any terminal device (not shown) in the building.

As an example of the purpose of the acceleration information and the sway information In08 of the building, there is a purpose of predicting vibration damage, breakage, or damage of a building using the acceleration information and the sway information of the building or a purpose of transmitting the acceleration information and the sway information of the building to any terminal device in the building to give an instruction to perform control for preventing the vibration damage, breakage, or damage of the building, or to notify a terminal of a resident.

The platform 200 uses the purchasing information stored in the purchasing information DB 210-1 and the vital information stored in the healthcare information DB 210-2 for purposes different from the purpose of ordering an item to the outside and the purpose of determining the health condition. For example, the platform 200 derives a nutritional value of the food ordered on the basis of the purchasing information stored in the purchasing information DB 210-1 collected for receiving the delivered delivery item (that is, for the first purpose). The platform 200 predicts a future health condition on the basis of the vital information stored in the healthcare information DB 210-2 collected for knowing the current health condition (that is, for a second purpose). The platform 200 derives the nutritional value of the food to be ingested to improve the health condition, on the basis of the derivation result of the nutritional value of the food and the prediction result of the future health condition. The platform 200 may order the food that can be ingested for its nutritional value from a pharmacy DR (that is, it may also be used for a third purpose) on the basis of the derivation result of the nutritional value of the food to be ingested to improve the health condition.

The platform 200 may also predict the future health condition on the basis of the vital information stored in the healthcare information DB 210-2 and the temperature and humidity information stored in the living environment information DB 210-3.

The gateway device 100 and the platform 200 included in the information processing system 1 will be sequentially described below.

Figure 3:
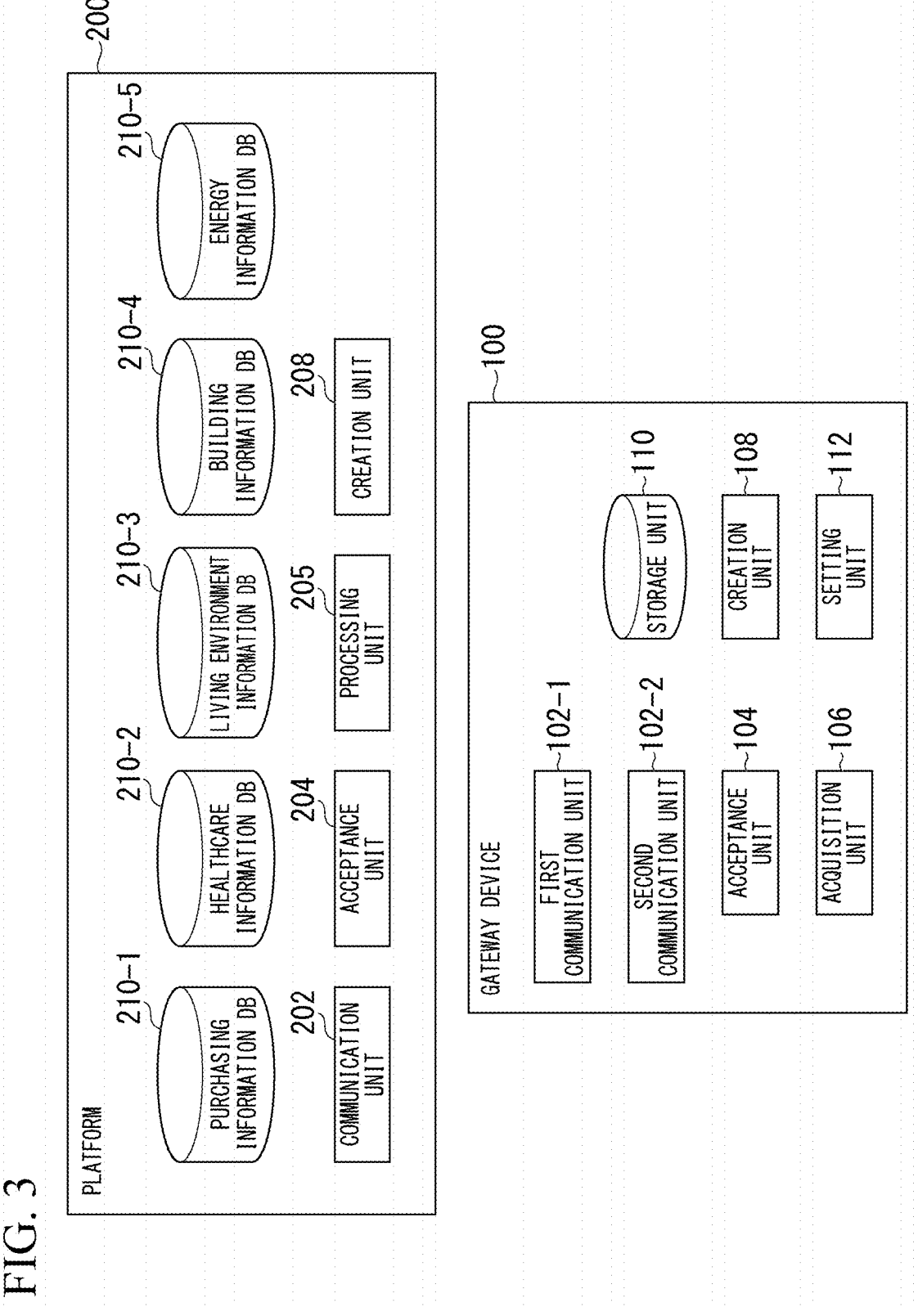
FIG. 3 is a diagram showing details of a gateway device and a platform included in the information processing system according to the present embodiment.

FIG. 3 is a diagram showing details of the gateway device and the platform included in the information processing system according to the present embodiment.
(Gateway Device 100)

The gateway device 100 is realized by a personal computer, a server, a smartphone, a tablet computer, an industrial computer, and the like. The gateway device 100 includes, for example, a first communication unit 102-1, a second communication unit 102-2, an acceptance unit 104, an acquisition unit 106, a creation unit 108, a storage unit 110, and a setting unit 112.

The first communication unit 102-1 is realized by a communication module. The first communication unit 102-1 communicates with an external communication device via a network NW. The first communication unit 102-1 may perform communication using, for example, a wireless communication scheme such as wireless LAN or LTE (registered trademark).

The second communication unit 102-2 is realized by a communication module. The second communication unit 102-2 performs communication using, for example, a short range wireless communication scheme such as Bluetooth (registered trademark). The storage unit 110 is realized by an HDD, a flash memory, a RAM, a ROM, or the like. The storage unit 110 stores applications.

The second communication unit 102-2 receives the information In01 transmitted by the image sensor SE01, the vital information In03 transmitted by the vital sensor SE03, the temperature and humidity information In05 transmitted by the temperature and humidity sensor SE05, the acceleration information In07 transmitted by the acceleration sensor SE07, and the power information In09 transmitted by the power measurement unit SE09.

The acceptance unit 104 accepts the information In01, the vital information In03, the temperature and humidity information In05, the acceleration information In07, and the power information In09 received by the second communication unit 102-2.

The acquisition unit 106 acquires the information In01 from the acceptance unit 104 and acquires purchasing information included in the acquired information In01 and identification information of the image sensor SE01. The acquisition unit 106 acquires information for specifying the purchasing information DB 210-1 as the accumulation destination associated with the acquired identification information of the image sensor SE01 from the storage unit that stores the accumulation destination information.

Here, the accumulation destination information is information in which the sensor identification information and the accumulation destination of the sensor information are associated with each other for each of the plurality of sensors. An example of the accumulation destination of the sensor information is information for specifying a database (DB) that accumulates the sensor information. The storage unit may be provided in the gateway device 100 or may be provided on a cloud (a cloud server).

The acquisition unit 106 acquires the vital information In03 from the acceptance unit 104, and acquires a detection result of a vital sign included in the acquired vital information In03 and identification information of the vital sensor SE03. The acquisition unit 106 acquires information for specifying the healthcare information DB 210-2 as the accumulation destination associated with the acquired identification information of the vital sensor SE03 from the storage unit that stores the accumulation destination information.

The acquisition unit 106 acquires the temperature and humidity information In05 from the acceptance unit 104, and acquires a detection result of a temperature and humidity included in the acquired temperature and humidity information In05 and identification information of the temperature and humidity sensor SE05. The acquisition unit 106 acquires information for specifying the living environment information DB 210-3 as the accumulation destination associated with the acquired identification information of the temperature and humidity sensor SE05 from the storage unit that stores the accumulation destination information.

The acquisition unit 106 acquires the acceleration information In07 from the acceptance unit 104, and acquires a detection result of an acceleration included in the acquired acceleration information In07 and identification information of the acceleration sensor SE07. The acquisition unit 106 acquires information for specifying the building information DB 210-4 as the accumulation destination associated with the acquired identification information of the acceleration sensor SE07 from the storage unit that stores the accumulation destination information.

The acquisition unit 106 acquires the power information In09 from the acceptance unit 104 and acquires power information included in the acquired power information In09 and identification information of the power measurement unit SE09. The acquisition unit 106 acquires information for specifying the energy information DB 210-5 as the accumulation destination associated with the acquired identification information of the power measurement unit SE09 from the storage unit that stores the accumulation destination information.

The creation unit 108 acquires purchasing information and information for specifying the purchasing information DB 210-1 from the acquisition unit 106. The creation unit 108 creates an image sensor information notification that includes the acquired purchasing information and has the purchasing information DB 210-1 as the destination (accumulation destination). The creation unit 108 outputs the created image sensor information notification to the first communication unit 102-1.

The first communication unit 102-1 acquires the image sensor information notification output from the creation unit 108 and transmits the acquired image sensor information notification to the platform 200.

The creation unit 108 acquires a detection result of the vital sign and information for specifying the healthcare information DB 210-2 from the acquisition unit 106. The creation unit 108 creates a vital sensor information notification that includes the acquired detection result of the vital sign and has the healthcare information DB 210-2 as the destination (accumulation destination). The creation unit 108 outputs the created vital sensor information notification to the first communication unit 102-1.

The first communication unit 102-1 acquires the vital sensor information notification output from the creation unit 108 and transmits the acquired vital sensor information notification to the platform 200.

The creation unit 108 acquires a detection result of the temperature and humidity and information for specifying the living environment information DB 210-3 from the acquisition unit 106. The creation unit 108 creates a temperature and humidity sensor information notification that includes the acquired detection result of the temperature and humidity and has the living environment information DB 210-3 as the destination (accumulation destination). The creation unit 108 outputs the created temperature and humidity sensor information notification to the first communication unit 102-1.

The first communication unit 102-1 acquires the temperature and humidity sensor information notification output from the creation unit 108 and transmits the acquired temperature and humidity sensor information notification to the platform 200.

The creation unit 108 acquires a detection result of the acceleration and information for specifying the building information DB 210-4 from the acquisition unit 106. The creation unit 108 creates an acceleration sensor information notification that includes the acquired detection result of the acceleration and has the building information DB 210-4 as the destination (accumulation destination). The creation unit 108 outputs the created acceleration sensor information notification to the first communication unit 102-1.

The first communication unit 102-1 acquires the acceleration sensor information notification output from the creation unit 108 and transmits the acquired acceleration sensor information notification to the platform 200.

The creation unit 108 acquires a detection result of the power and information for specifying the energy information DB 210-5 from the acquisition unit 106. The creation unit 108 creates a power sensor information notification that includes the acquired detection result of the power and has the energy information DB 210-5 as the destination (accumulation destination). The creation unit 108 outputs the created power sensor information notification to the first communication unit 102-1.

The first communication unit 102-1 acquires the power sensor information notification output from the creation unit 108 and transmits the acquired power sensor information notification to the platform 200.

The first communication unit 102-1 receives the order information In02 transmitted by the platform 200, the result In04 of determining the health condition, the result In06 of determining the temperature and humidity of the building, and the sway information In08 of the building.

The acceptance unit 104 acquires the order information In02, the result In04 of determining the health condition, the result In06 of determining the temperature and humidity of the building, and the sway information In08 of the building from the first communication unit 102-1. The acceptance unit 104 accepts the order information In02, the result In04 of determining the health condition, the result In06 of determining the temperature and humidity of the building, and the sway information In08 of the building which are acquired.

The creation unit 108 acquires the order information In02 from the acceptance unit 104. The creation unit 108 creates an order information notification that includes the acquired order information In02 and has, for example, the address of a terminal device (not shown) in a pantry in a building as the destination. An example of an address is an IP address. The creation unit 108 outputs the created order information notification to the first communication unit 102-1.

The first communication unit 102-1 acquires the order information notification output from the creation unit 108 and transmits the acquired order information notification to, for example, a terminal device in a pantry in a building.

The creation unit 108 acquires the result In04 of determining the health condition from the acceptance unit 104. The creation unit 108 creates a health condition notification that includes the acquired result In04 of determining the health condition and has the address of any terminal device (not shown) in the building as the destination. The creation unit 108 outputs the created health condition notification to the first communication unit 102-1.

The first communication unit 102-1 acquires the health condition notification output from the creation unit 108 and transmits the acquired health condition notification to any terminal device in the building.

The creation unit 108 acquires the result In06 of determining the temperature and humidity of the building from the acceptance unit 104. The creation unit 108 creates a temperature and humidity determination result notification that includes the acquired result In06 of determining the temperature and humidity of the building and has, for example, the address of any terminal device (not shown) in a building as the destination. The creation unit 108 outputs the created temperature and humidity determination result notification to the first communication unit 102-1.

The first communication unit 102-1 acquires the temperature and humidity determination result notification output from the creation unit 108 and transmits the acquired temperature and humidity determination result notification to any terminal device in the building.

The creation unit 108 acquires the sway information In08 of the building from the acceptance unit 104. The creation unit 108 creates a sway information notification that includes the acquired sway information In08 of the building and has, for example, the address of any terminal device (not shown) in a building as the destination. The creation unit 108 outputs the created sway information notification to the first communication unit 102-1.

The first communication unit 102-1 acquires the sway information notification output from the creation unit 108 and transmits the acquired sway information notification to any terminal device in the building.

The first communication unit 102-1 receives output destination information transmitted by the terminal device (not shown). The terminal device may be installed in the building BU or installed outside the building BU. The setting unit 112 acquires the output destination information received by the first communication unit 102-1. The setting unit 112 sets an association between the sensor identification information and the accumulation destination of the sensor information included in the output destination information stored in the storage unit, on the basis of the acquired output destination information.

(Platform 200)

The platform 200 is realized using a personal computer, a server, a smartphone, a tablet computer, an industrial computer, and the like. The platform 200 includes, for example, a communication unit 202, an acceptance unit 204, a processing unit 205, a creation unit 208, a purchasing information DB 210-1, a healthcare information DB 210-2, a living environment information DB 210-3, a building information DB 210-4, and an energy information DB 210-5.

The communication unit 202 is realized by a communication module. The communication unit 202 communicates with an external communication device via a network NW. The communication unit 202 may perform communication using, for example, a wireless communication scheme such as wireless LAN or LTE (registered trademark).

The purchasing information DB 210-1, the healthcare information DB 210-2, the living environment information DB 210-3, the building information DB 210-4, and the energy information DB 210-5 are realized by an HDD, a flash memory, a RAM, a ROM, and the like. Purchasing information is stored in the purchasing information DB 210-1, vital information is stored in the healthcare information DB 210-2, temperature and humidity information is stored in the living environment information DB 210-3, acceleration information is stored in the building information DB 210-4, and power information is stored in the energy information DB 210-5.

The communication unit 202 receives an image sensor information notification transmitted by the gateway device 100. The acceptance unit 204 acquires the image sensor information notification from the communication unit 202 and accepts the acquired image sensor information notification. The processing unit 205 acquires the image sensor information notification from the acceptance unit 204 and stores the purchasing information included in the acquired sensor information notification in the purchasing information DB 210-1 which is the destination (accumulation destination).

The communication unit 202 receives the vital sensor information notification transmitted by the gateway device 100. The acceptance unit 204 acquires the vital sensor information notification from the communication unit 202 and accepts the acquired vital sensor information notification. The processing unit 205 acquires the vital sensor information notification from the acceptance unit 204 and stores the vital information included in the acquired vital sensor information notification in the healthcare information DB 210-2 which is the destination (accumulation destination).

The communication unit 202 receives the temperature and humidity information notification transmitted by the gateway device 100. The acceptance unit 204 acquires the temperature and humidity information notification from the communication unit 202 and accepts the acquired temperature and humidity information notification. The processing unit 205 acquires the temperature and humidity information notification from the acceptance unit 204 and stores the temperature and humidity information included in the acquired temperature and humidity information notification in the living environment information DB 210-3 which is the destination (accumulation destination).

The communication unit 202 receives the acceleration information notification transmitted by the gateway device 100. The acceptance unit 204 acquires the acceleration information notification from the communication unit 202 and accepts the acquired acceleration information notification. The processing unit 205 acquires the acceleration information notification from the acceptance unit 204 and stores the acceleration information included in the acquired acceleration information notification in the building information DB 210-4 which is the destination.

The communication unit 202 receives the power information notification transmitted by the gateway device 100. The acceptance unit 204 acquires the power information notification from the communication unit 202 and accepts the acquired power information notification. The processing unit 205 acquires the power information notification from the acceptance unit 204 and stores the power information included in the acquired power information notification in the energy information DB 210-5 which is the destination (accumulation destination).

The processing unit 205 orders items to an outside EX on the basis of the purchasing information stored in the purchasing information DB 210-1. Purchasing information is stored in the purchasing information DB 210-1 for a purpose of ordering an item to the outside EX. The creation unit 208 creates purchasing information In02 of the item and outputs the created purchasing information In02 of the item to the communication unit 202. The communication unit 202 transmits the purchasing information In02 of the item output from the creation unit 208 to the gateway device 100.

The processing unit 205 determines a health condition on the basis of the vital information stored in the healthcare information DB 210-2. Vital information is stored in the healthcare information DB 210-2 for a purpose of determining the health condition. The creation unit 208 creates a result In04 of determining the health condition and outputs the created result In04 of determining the health condition to the communication unit 202. The communication unit 202 transmits the result In04 of determining the health condition output from the creation unit 208 to the gateway device 100.

The processing unit 205 determines the temperature and humidity of the building on the basis of the temperature and humidity information stored in the living environment information DB 210-3. Temperature and humidity information is stored in the living environment information DB 210-3 for a purpose of determining the temperature and humidity of the building. The creation unit 208 creates a result In06 of determining the temperature and humidity of the building and outputs the created result In06 of determining the temperature and humidity of the building to the communication unit 202. The communication unit 202 transmits the result In06 of determining the temperature and humidity of the building output from the creation unit 208 to the gateway device 100.

The processing unit 205 determines the acceleration occurring in the building on the basis of the acceleration information stored in the building information DB 210-4, and determines the sway of the building on the basis of a result of determining the acceleration occurring in the building. The acceleration information is stored in the building information DB 210-4 for the purpose in determining the acceleration occurring in the building and determining the sway of the building on the basis of the result of determining the acceleration occurring in the building. The creation unit 208 creates sway information In08 of the building and outputs the created sway information In08 of the building to the communication unit 202. The communication unit 202 transmits the sway information In08 of the building output from the creation unit 208 to the gateway device 100.

The processing unit 205 uses the information for purposes different from the purpose of the information stored in the purchasing information DB 210-1, the purpose of the information stored in the healthcare information DB 210-2, the purpose of the information stored in the living environment information DB 210-3, the purpose of the information stored in the building information DB 210-4, and the purpose of the information stored in the energy information DB 210-5, on the basis of at least two of the information stored in the purchasing information DB 210-1, the information stored in the healthcare information DB 210-2, the information stored in the living environment information DB 210-3, the information stored in the building information DB 210-4, and the information stored in the energy information DB 210-5.

In a case of being used for different purposes, the processing unit 205 may derive an evaluation value (information) for use in different purposes by performing some calculation. The processing unit 205 may generate an extended service from the derived evaluation value (information). An example of the extended service may be a service related to daily life, a service related to wellness, a service related to resilience, or a service related to sustainability.

As an example, a case where the processing unit 205 uses the purchasing information stored in the purchasing information DB 210-1 and the vital information stored in the healthcare information DB 210-2 for purposes different from the purpose of ordering an item to the outside EX and the purpose of determining the health condition will be described.

For example, the processing unit 205 derives the nutritional value of the food ordered on the basis of the purchasing information stored in the purchasing information DB 210-1. The processing unit 205 predicts the future health condition on the basis of the vital information stored in the healthcare information DB 210-2. The processing unit 205 derives the nutritional value of the food to be ingested to improve the health condition, on the basis of the derivation result of the nutritional value of the food and the prediction result of the future health condition. The processing unit 205 may order the food that can be ingested for its nutritional value from the pharmacy DR on the basis of the derivation result of the nutritional value of the food to be ingested to improve the health condition.

The processing unit 205 may also predict the future health condition on the basis of the vital information stored in the healthcare information DB 210-2 and the temperature and humidity information stored in the living environment information DB 210-3.

(Operation of Information Processing System 1)

Figure 4:
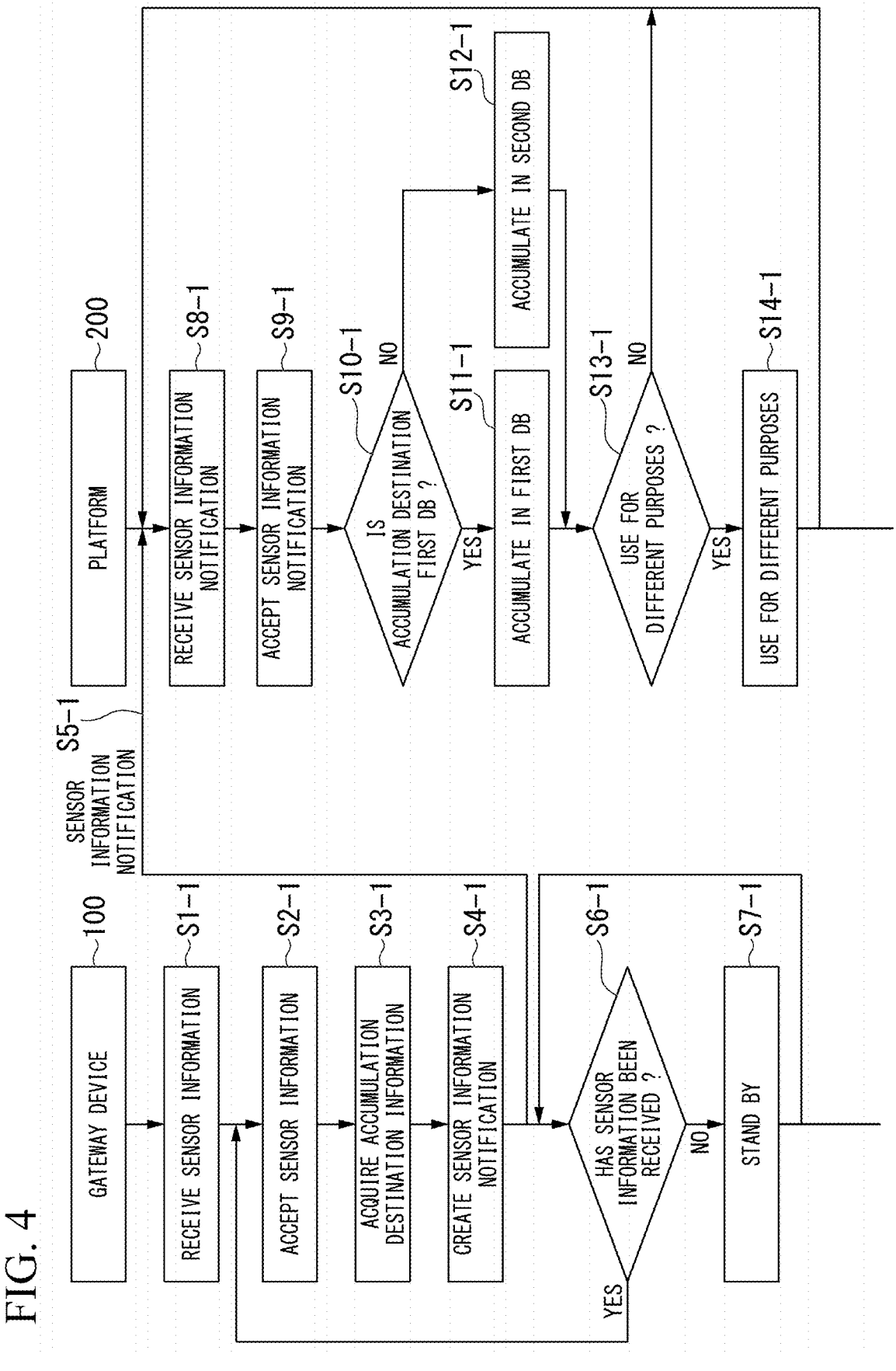
FIG. 4 is a flowchart showing an example of an operation of the information processing system according to the present embodiment.

FIG. 4 is a flowchart showing an example of an operation of the information processing system. With reference to FIG. 4, as an example, a case will be described where sensor information is accumulated in each of a first accumulation destination (first DB) and a second accumulation destination (second DB) that are any two information DBs among the purchasing information DB 210-1, the healthcare information DB 210-2, the living environment information DB 210-3, the building information DB 210-4, and the energy information DB 210-5, and one or more pieces of first sensor information accumulated in the first accumulation destination and one or more pieces of second sensor information accumulated in the second accumulation destination are used for a third purpose different from a purpose of the first sensor information and a purpose of the second sensor information on the basis of the one or more pieces of first sensor information and the one or more pieces of second sensor information.

Note that the purpose of the first sensor information is also referred to as a first purpose. The purpose of the second sensor information is also referred to as a second purpose. The first purpose and the second purpose are different from each other.

As an example, a case where the first purpose is "promotion of purchase amount", the second purpose is "promotion of energy saving", and the third purpose is "health promotion" will be described.

(1) First Purpose (Promotion of Purchase Amount)

From the purchasing information included in the acquired sensor information (information In01), purchasing information of "vegetables" and "meat" is extracted. Information for promoting purchase is presented on the basis of the extracted purchasing information over time. For example, special sale information or recipe information is displayed on a terminal device of a purchaser whose purchase amount has been decreased by a predetermined amount or more since last month.

(2) Second Purpose (Promotion of Energy Saving)

The temperature and humidity data for each room of the house is managed for each time period on the basis of the acquired sensor information (the temperature and humidity information In05), and the air conditioner is controlled, whereby the amount of useless power consumption is reduced.

(3) Third Purpose (Health Promotion)

The purchasing information included in the acquired sensor information (the information In01) and the sensor information (the temperature and humidity information In05) are combined with each other to distribute an advertisement for promoting a gymnastics program to a target subject whose temperature data in a house in a summer is lower than the average by a certain level or more, among purchasers whose purchase data of "vegetables" and "meat" is less than the average.

For example, in a case where the consumption of vegetables and meat by the user is less than the average and the room temperature of the room of the user is lower than the average room temperature, it is presumed that the internal energy metabolism of the user has decreased. In this case, it is possible to achieve health promotion by recovering the internal energy metabolism of the user.

In addition, a coefficient a1 and a coefficient a2 may be calculated by converting the food purchase history into the nutritional value of ingestion on the basis of the purchasing information included in the sensor information (information In01) in a calculation target period, a coefficient a3 may be calculated on the basis of the sensor information (temperature and humidity information In05) in the calculation target period, and a nutritional value amount f(x) of the user in the target period may be created on the basis of the following Expression (1).

$$f(x) = a1 \cdot x1 + a2 \cdot x2 + a3 \cdot x3 \qquad (1)$$

As an example, a1 is the amount of protein ingested by the user in the calculation target period, a2 is the amount of vitamin A ingested by the user in the calculation target period, and a3 is the average temperature of the room of the user in the calculation target period.

The nutritional value amount f(x) that is in vivo utilized by the user in the calculation target period is calculated on the basis of the sensor information (information In01) and the sensor information (temperature and humidity information In05), and a health promotion program appropriate for the user is recommended.

Here, the combination of the first purpose, the second purpose, and the third purpose described above is an example, and the present invention is not limited thereto. For example, the combination may be a health promotion purpose for the first purpose, a purchase promotion use for the second purpose, and an energy saving purpose for the third purpose.

That is, the first purpose, the second purpose, and the third purpose are combinations corresponding to any of the purchase promotion purpose, the energy saving purpose, and the health promotion purpose.

In addition, the above-described purposes are examples, and the first purpose, the second purpose, and the third purpose may be purposes other than the purchase promotion purpose, the energy saving purpose, and the health promotion purpose.

Moreover, the first sensor information is information output from the first sensor. Further, the first sensor may be configured with a plurality of sensors (for example, a sensor group). In this case, the first sensor information may be configured as sensor information (for example, a sensor information group) output from each of the plurality of sensors. In this case, the configuration may be such that the information from the first sensor group is used for the first purpose.

Note that the second sensor information may also be configured with the sensor information (for example, the sensor information group) output from the plurality of sensors (for example, the sensor group) similarly to the first sensor information described above.
(Step S1-1)

In the gateway device 100, the second communication unit 102-2 receives sensor information.
(Step S2-1)

In the gateway device 100, the acceptance unit 104 accepts the sensor information received by the second communication unit 102-2.
(Step S3-1)

In the gateway device 100, the acquisition unit 106 acquires the sensor information from the acceptance unit 104 and acquires first sensor identification information or second sensor identification information included in the acquired sensor information. Here, as an example, a description continues with a case where the acquisition unit 106 acquires the first sensor identification information. The acquisition unit 106 acquires information for specifying the first DB associated with the acquired first sensor identification information from the storage unit that stores the accumulation destination information.
(Step S4-1)

In the gateway device 100, the creation unit 108 acquires the first sensor information and the information specifying the first DB from the acquisition unit 106. The creation unit 108 creates a sensor information notification that includes the acquired first sensor information and has the first DB as the destination (accumulation destination).
(Step S5-1)

In the gateway device 100, the creation unit 108 outputs the created sensor information notification to the first communication unit 102-1. The first communication unit 102-1 acquires the sensor information notification output from the creation unit 108 and transmits the acquired sensor information notification to the platform 200.
(Step S6-1)

In the gateway device 100, the second communication unit 102-2 determines whether or not sensor information has been received. In a case where the sensor information has been received, the process proceeds to step S2-1.
(Step S7-1)

In the gateway device 100, in a case where the second communication unit 102-2 determines that the sensor information has not been received, the process proceeds to step S6-1.

In the gateway device 100, steps S1-1 to S7-1 are continuously executed.
(Step S8-1)

In the platform 200, the communication unit 202 receives the sensor information notification transmitted by the gateway device 100.
(Step S9-1)

In the platform 200, the acceptance unit 204 acquires the sensor information notification from the communication unit 202 and accepts the acquired sensor information notification.
(Step S10-1)

In the platform 200, the processing unit 205 acquires the sensor information notification from the acceptance unit 204 and determines whether or not the accumulation destination included in the acquired sensor information notification is the first DB.
(Step S11-1)

In the platform 200, in a case where the accumulation destination included in the sensor information notification is the first DB, the processing unit 205 stores the first sensor information in the first DB.
(Step S12-1)

In the platform 200, in a case where the accumulation destination included in the sensor information notification is not the first DB, the processing unit 205 stores the second sensor information in the second DB.
(Step S13-1)

In the platform 200, the processing unit 205 determines whether or not the purpose of the sensor information accumulated in the first DB and the purpose of the sensor information accumulated in the second DB are used for purposes different from each other, on the basis of the first DB and the second DB. In a case where it is determined that the purposes are not used for different purposes, the process proceeds to step S8-1.
(Step S14-1)

In the platform 200, in a case where the processing unit 205 determines that the purposes are used for different purposes, the processing unit 205 uses the purposes for different purposes.

In FIG. 3, as an example, the case where sensor information is accumulated in each of the first DB and the second DB, and one or more pieces of first sensor information accumulated in the first DB and one or more pieces of second sensor information accumulated in the second DB are used for a third purpose different from the purpose of the first sensor information and the purpose of the second sensor information on the basis of the one or more pieces of first sensor information and the one or more pieces of second sensor information has been described. However, the present invention is not limited this example.

For example, the present invention can be applied to a case where sensor information is accumulated in each of three or more accumulation destinations, and one or more pieces of the sensor information accumulated in each of three or more DBs are used for a third purpose different from the purpose of the sensor information accumulated in each of three or more DBs, on the basis of the one or more pieces of the sensor information accumulated in each of three or more DBs.

In the embodiment described above, the case where the building BU includes the image sensor SE01, the vital sensor SE03, the temperature and humidity sensor SE05, the acceleration sensor SE07, and the power measurement unit SE09 has been described. However, the present invention is not limited to this example. For example, the building BU may include at least two types (two) of the image sensor SE01, the vital sensor SE03, the temperature and humidity sensor SE05, the acceleration sensor SE07, and the power measurement unit SE09, and may further include one or more different types of sensors, such as an illuminance sensor, a solar radiation amount sensor, an atmospheric pressure sensor, and a sound pressure sensor. For example, the illuminance sensor detects illuminance, and transmits illuminance information including a detection result of the illuminance and the identification information of the illuminance sensor to the gateway device 100. The solar radiation amount sensor detects a solar radiation amount, and transmits solar radiation amount information including a detection result of the solar radiation amount and identification information of the solar radiation amount sensor to the gateway device 100. The atmospheric pressure sensor detects atmospheric pressure, and transmits atmospheric pressure information including a detection result of the atmospheric pressure and identification information of the atmospheric pressure sensor to the gateway device 100. The sound pressure sensor detects sound pressure, and transmits sound pressure information including a detection result of the sound pressure and identification information of the atmospheric pressure sensor to the gateway device 100.

With the information processing system 1 according to the present embodiment, the information processing system 1 includes the platform 200 and the gateway device 100, and the gateway device 100 includes: the acceptance unit 104 that accepts sensor information output from each of a plurality of sensors; the acquisition unit 106 that acquires, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information accepted by the acceptance unit 104, and that acquires, from the storage unit, information for specifying a second database related to second sensor identification information of second sensor information different from the first sensor information accepted by the acceptance unit 104; the creation unit 108 that creates a first sensor information notification with the first database including the first sensor information as an accumulation destination, and a second sensor information notification with the second database including the second sensor information as an accumulation destination; and a communication unit as a first communication unit 102-1 that transmits the first sensor information notification and the second sensor information notification to the platform 200.

With such a configuration, in the information processing system 1, the gateway device 100 can accept sensor information output from each of a plurality of sensors, acquire information for specifying a first database related to first sensor identification information of first sensor information that is accepted, acquire information for specifying a second database related to second sensor identification information of second sensor information that is accepted, and create a first sensor information notification with the first database including the first sensor information as an accumulation destination and a second sensor information notification with the second database including the second sensor information as an accumulation destination. For this reason, the gateway device 100 can transmit the first sensor information notification and the second sensor information notification to the platform.

In the information processing system 1 described above, the platform 200 includes the processing unit that uses the first sensor information and the second sensor information for a third purpose different from a first purpose of the first sensor information and a second purpose of the second sensor information.

With such a configuration, the platform 200 can use the first sensor information and the second sensor information for a third purpose different from a first purpose of the first sensor information and a second purpose of the second sensor information. For this reason, the platform 200 can integrate and use the first sensor information and the second sensor information, and use the integrated information for a third purpose different from the first purpose and the second purpose.

In the information processing system 1 described above, the processing unit 205 creates information for use in the third purpose.

With such a configuration, the information processing system 1 can create information (evaluation value) for use in the third purpose on the basis of the first sensor information and the second sensor information.

In the information processing system 1 described above, the first database accumulates the first sensor information for the first purpose, and the second database accumulates the second sensor information for the second purpose.

With such a configuration, the first database can accumulate the first sensor information for the first purpose, and the second database can accumulate the second sensor information for the second purpose. For this reason, the first database can use the accumulated first sensor information for the first purpose, and the second database can use the accumulated second sensor information for the second purpose.

In the information processing system 1 described above, the gateway device 100 further includes the setting unit 112 that sets accumulation destination information in which sensor identification information and information for specifying a database that accumulates the sensor information corresponding to the sensor identification information are associated with each other for each of the plurality of sensors.

With such a configuration, the gateway device 100 can set accumulation destination information in which sensor identification information and information for specifying a database that accumulates the sensor information corresponding to the sensor identification information are associated with each other for each of the plurality of sensors. The accumulation destination information may be output from the outside of the information processing system. By being able to set the accumulation destination information, it is possible to set the accumulation destination information and change the accumulation destination information.

In the information processing system 1 described above, each of a plurality of pieces of the sensor information is any of vital information, temperature and humidity information, acceleration information, power information, purchasing information, illuminance information, solar radiation amount information, atmospheric pressure information, and sound pressure information.

With such a configuration, the information processing system 1 can accept first sensor information and second sensor information that are any of vital information, temperature and humidity information, acceleration information, power information, purchasing information, illuminance information, solar radiation amount information, atmospheric pressure information, and sound pressure information, acquire a first database related to first sensor identification information of the accepted first sensor information and a second database related to second sensor identification information of the accepted second sensor information, and create a first sensor information notification with the first database including the first sensor information as an accumulation destination and a second sensor information notification with the second database including the second sensor information as an accumulation destination. For this reason, the gateway device 100 can transmit the first sensor information notification and the second sensor information notification to the platform.

In addition, especially, in a case where the combination of the plurality of pieces of sensor information is the vital information, the temperature and humidity information, the illuminance information, and the solar radiation amount information, the information processing system can provide the user with information for promoting the user's health.

In the information processing system 1 described above, each of the plurality of sensors is installed in a building.

With such a configuration, the information processing system 1 can accept sensor information output from each of a plurality of sensors installed in the building, acquire information for specifying a first database related to first sensor identification information of first sensor information that is accepted and information for specifying a second database related to second sensor identification information of second sensor information that is accepted, and create a first sensor information notification with the first database including the first sensor information as an accumulation destination and a second sensor information notification with the second database including the second sensor information as an accumulation destination. For this reason, the gateway device 100 can transmit the first sensor information notification and the second sensor information notification to the platform.

Although the embodiments and their modification examples have been described above, these embodiments and their modification examples are presented as examples, and are not intended to limit the scope of the invention. These embodiments and their modification examples can be implemented in various other forms, and various omissions, substitutions, changes, and combinations can be made without departing from the gist of the invention. These embodiments and their modification examples are included within the scope and gist of the invention, as well as within the scope of the invention described in the claims and its equivalents.

Note that the gateway device 100 and the platform 200 described above are realized by including a computer, as described above. In this case, a program for realizing the functions of each functional block is recorded on a computer-readable recording medium. It may be realized by causing a computer system to read program recorded on this recording medium and causing a CPU to execute the program. The "computer system" mentioned herein includes an operating system (OS) and hardware such as peripheral devices.

Furthermore, the term "computer-readable recording medium" refers to a portable medium such as a flexible disk, a magneto-optical disk, a ROM, and a CD-ROM. Furthermore, the "computer-readable recording medium" includes a storage device such as a hard disk built in a computer system.

Furthermore, the term "computer-readable recording medium" may include a medium that dynamically holds a program for a short period of time. An example of a medium that dynamically holds a program for a short period of time is a communication line used to transmit a program via a network such as the Internet or a communication line such as a telephone line.

Further, the "computer-readable recording medium" may also include a medium that holds a program for a certain period of time, such as a volatile memory inside a computer system that is a server or a client.

Moreover, the above program may be a program for realizing some of the functions described above. Moreover, the above program may be a program that can realize the above-described functions in combination with a program already recorded in the computer system.

Moreover, the above program may be realized using a programmable logic device. The programmable logic device is, for example, a field-programmable gate array (FPGA).

Note that the gateway device 100 and platform 200 described above have computers inside. The processes of the processing of the gateway device 100 and the platform 200 described above are stored in a computer-readable recording medium in a program format, and the computer reads and executes the program to perform the processing. Here, the computer-readable recording medium refers to a magnetic disk, a magneto-optical disk, a CD-ROM, a DVD-ROM, a semiconductor memory, and the like. Alternatively, this computer program may be distributed to a computer via a communication line, and the computer receiving the distribution may execute the program.

Moreover, the above-mentioned program may be a program for realizing some of the above-mentioned functions.

Furthermore, the program may be a so-called difference file (difference program) that can realize the above-described functions in combination with a program already recorded in the computer system.

REFERENCE SIGNS LIST

1: Information processing system
100: Gateway device
102-1: First communication unit
102-2: Second communication unit
104: Acceptance unit
106: Acquisition unit
108: Creation unit
110: Storage unit
112: Setting unit
200: Platform
202: Communication unit
204: Acceptance unit
205: Processing unit
208: Creation unit
210-1: Purchasing information DB
210-2: Healthcare information DB
210-3: Living environment information DB
210-4: Building information DB
210-5: Energy information DB

What is claimed is:

1. An information processing system comprising a platform and a gateway device, wherein the gateway device is configured to:

accept sensor information output from each of a plurality of sensors;

acquire, from a storage unit that stores accumulation destination information in which sensor identification information and information for specifying a database that accumulates a plurality of pieces of sensor information corresponding to the sensor identification information are associated with each other for each of the plurality of sensors, information for specifying a first database related to first sensor identification information of first sensor information accepted by the gateway device, and to acquire, from the storage unit, information for specifying a second database related to second sensor identification information of second sensor information different from the first sensor information accepted by the gateway device;

create a first sensor information notification with the first database including the first sensor information as an accumulation destination, and a second sensor information notification with the second database including the second sensor information as an accumulation destination; and a communication unit configured to transmit the first sensor information notification and the second sensor information notification to the platform; and a processing unit is configured to use the first sensor information and the second sensor information for a third purpose different from a first purpose of the first sensor information and a second purpose of the second sensor information; and the processing unit derives a nutritional value of food ordered on the basis of purchasing information collected for receiving a delivered delivery item by the first sensor information as the first purpose, predicts a future health condition on the basis of vital information collected for knowing current health condition by the second sensor information as the second purpose, and orders the food on the basis of the derivation result of the nutritional value and the prediction result of the future health condition to be ingested to improve the current health condition as the third purpose.

2. The information processing system according to claim 1, wherein each of the plurality of sensors includes an image recognition sensor configured to generate, as the plurality of pieces of sensor information, information obtained by performing digital conversion on information described in a medium through image recognition.

3. The information processing system according to claim 1, wherein the sensor information output from each of the plurality of sensors includes purchasing information indicating a purchase status of a user, and the gateway device acquires the purchasing information as the first sensor information.

4. The information processing system according to claim 1, wherein the first purpose, the second purpose, and the third purpose are a combination corresponding to any of a purchase promotion purpose, an energy saving purpose, and a health promotion purpose.

5. The information processing system according to claim 1, wherein a usage mode of the first sensor information in a case of using the first sensor information for the third purpose and a usage mode of the first sensor information in a case of using the first sensor information for the first purpose are different from each other.

6. The information processing system according to claim 1, wherein the first database accumulates the first sensor information for the first purpose, and the second database accumulates the second sensor information for the second purpose.

7. The information processing system according to claim 1, wherein the gateway device is further configured to set accumulation destination information in which the first sensor identification information and information for specifying the first database that accumulates the first sensor information corresponding to the first sensor identification information are associated with each other for the first sensor, and the second sensor identification information and information for specifying the second database that accumulates the second sensor information corresponding to the second sensor identification information are associated with each other for the second sensor.

8. The information processing system according to claim 1, wherein each of the plurality of pieces of the sensor information is any of vital information, temperature and humidity information, acceleration information, power information, purchasing information, illuminance information, solar radiation amount information, atmospheric pressure information, and sound pressure information.

9. The information processing system according to claim 8, wherein a combination of the plurality of pieces of sensor information is vital information, temperature and humidity information, illuminance information, and solar radiation amount information.

10. The information processing system according to claim 1, wherein each of the plurality of sensors is installed in a building.

11. An information processing method executed by a computer, the information processing method comprising:

accepting sensor information output from each of a plurality of sensors;

acquiring, from a storage unit that stores accumulation destination information in which sensor identification information and information for specifying a database that accumulates the sensor information corresponding to the sensor identification information are associated with each other for each of the plurality of sensors, information for specifying a first database related to first sensor identification information of first sensor information among the accepted sensor information, and acquiring, from the storage unit, information for specifying a second database related to second sensor identification information of second sensor information among the accepted sensor information;

creating a first sensor information notification with the first database including the first sensor information as an accumulation destination, and a second sensor information notification with the second database including the second sensor information as an accumulation destination;

transmitting the first sensor information notification and the second sensor information notification to the platform;

deriving a nutritional value of food ordered on the basis of purchasing information collected for receiving a delivered delivery item by the first sensor information as a first purpose;

predicting a future health condition on the basis of vital information collected for knowing current health condition by the second sensor information as a second purpose;

creating information for use in ordering the food on the basis of the derivation result of nutritional value of the food and the prediction result of the future health condition; and ordering the food on the basis of the created information for use in ordering the food to improve the current health condition as a third purpose different from the first purpose of the first sensor information and the second purpose of the second sensor information.

12. A non-transitory non-volatile storage medium in which a computer-readable program is stored, the program causing a computer to execute:

accepting sensor information output from each of a plurality of sensors;

acquiring, from a storage unit that stores accumulation destination information in which sensor identification information and information for specifying a database that accumulates a plurality of pieces of sensor information corresponding to the sensor identification information are associated with each other for each of the plurality of sensors, information for specifying a first database related to first sensor identification information of first sensor information among the accepted sensor information, and acquiring, from the storage unit, information for specifying a second database related to second sensor identification information of second sensor information among the accepted sensor information;

creating a first sensor information notification with the first database including the first sensor information as an accumulation destination, and a second sensor information notification with the second database including the second sensor information as an accumulation destination;

transmitting the first sensor information notification and the second sensor information notification to the platform;

deriving a nutritional value of food ordered on the basis of purchasing information collected for receiving a delivered delivery item by the first sensor information as a first purpose;

predicting a future health condition on the basis of vital information collected for knowing current health condition by the second sensor information as a second purpose;

creating information for use in ordering the food on the basis of the derivation result of nutritional value of the food and the prediction result of the future health condition; and ordering the food on the basis of the created information for use in ordering the food to improve the current health condition as a third purpose different from the first purpose of the first sensor information and the second purpose of the second sensor information.

* * * * *